United States Patent
Bai et al.

(10) Patent No.: US 8,767,288 B2
(45) Date of Patent: Jul. 1, 2014

(54) MULTIMODE OPTICAL AMPLIFIER WITH CLOSE-LOOP MODAL GAIN CONTROL

(75) Inventors: Neng Bai, Orlando, FL (US); Ezra Ip, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 196 days.

(21) Appl. No.: 13/444,371

(22) Filed: Apr. 11, 2012

(65) Prior Publication Data
US 2012/0262780 A1    Oct. 18, 2012

Related U.S. Application Data

(60) Provisional application No. 61/474,899, filed on Apr. 13, 2011.

(51) Int. Cl.
*H04B 10/17* (2006.01)
*H04B 10/2581* (2013.01)
*H01S 3/067* (2006.01)

(52) U.S. Cl.
CPC ......... *H04B 10/2581* (2013.01); *H01S 3/06754* (2013.01)
USPC ...................... 359/341.33; 359/341.4; 398/44

(58) Field of Classification Search
CPC .................. H04B 10/2581; H01S 3/06754
USPC .............................. 359/341.33, 341.4; 398/44
See application file for complete search history.

(56) References Cited

U.S. PATENT DOCUMENTS

| | | | |
|---|---|---|---|
| 5,187,759 A | 2/1993 | DiGiovanni et al. | |
| 7,406,237 B2* | 7/2008 | Bickham et al. | 385/127 |
| 7,576,909 B2 | 8/2009 | Harter et al. | |
| 2003/0202547 A1 | 10/2003 | Fermann et al. | |
| 2004/0233941 A1* | 11/2004 | Fajardo et al. | 372/6 |
| 2010/0329681 A1 | 12/2010 | Carlson et al. | |

OTHER PUBLICATIONS

Bai et al. "Multimode fiber amplifier with tunable modal gain using a reconfigurable multimode pump", Optics express, vol. 19, issue 17, p. 16601 (Aug. 15, 2011).*

Krummrich and Petermann, "Evaluation of Potential Optical Amplifier Concepts for Coherent Mode Multiplexing", Optical fiber communication conference, p. OMH5, Mar. 6-10, 2011.*

Amin, A., et al. "Dual-LP Mode 4x4 MIMO-OFDM Transmission Over a Two-Mode Fiber" Optical Society of America, Optics Express, vol. 19, No. 17. Aug. 2011. (8 Pages).

Gong, M., et al. "Numerical Modeling of Transverse Mode Competition in Strongly Pumped Multimode Fiber Lasers and Amplifiers" Optical Society of America, Optics Express, vol. 15, No. 6. Mar. 2007. (11 Pages).

(Continued)

*Primary Examiner* — Eric Bolda
(74) *Attorney, Agent, or Firm* — Joseph Kolodka

(57) ABSTRACT

Systems and methods for amplification are shown that include a pump preparation module configured to provide a pump output that includes a plurality of pump modes; an amplification module configured to accept a multimode signal input and the pump output, such that the pump output causes an amplification of a plurality of modes in the signal input to produce an amplified signal output; and a gain control module configured to adjust a balance of the plurality of pump modes in the pump output to produce a predetermined amplified signal output.

19 Claims, 8 Drawing Sheets

(56) References Cited

OTHER PUBLICATIONS

Koebele, C., et al. "Two Mode Transmission at 2X100GB/S, Over 40KM-Long Prototype Few-Mode Fiber, Using LCOS-Based Programmable Mode Multiplexer and Demultiplexer" Optical Society of America, Optics Express, vol. 19, No. 17. Aug. 2011. (8 Pages).

Koplow, J., et al. "Single-Mode Operation of a Coiled Multimode Fiber Amplifier" Optical Society of America, Optics Letters, vol. 25, No. 7. Apr. 2000. pp. 442-444.

Mickelson, A., et al. "Mode-Dependent Attenuation in Optical Fibers" Optical Society of America, vol. 73, No. 10. Oct. 1983. pp. 1282-1290.

Olshansky, R., et al. "Mode-Dependent Attenuation of Optical Fibers: Excess Loss" Applied Optics, vol. 15, No. 4. Apr. 1976. pp. 1045-1047.

Randel, S., et al. "6×56-GB/S Mode-Division Multiplexed Transmission Over 33-KM Few-Mode Fiber Enabled by 6×6 MIMO Equalization" Optical Society of America, Optics Express, vol. 19, No. 17. Aug. 2011. (11 Pages).

Sorin, W., et al. "Highly Selective Evanescent Modal Filter for Two-Mode Optical Fibers" Optical Society of America, Optics Letters, vol. 11, No. 9. Sep. 1986. pp. 581-583.

Spellmeyer, N., et al. "Communications Performance of a Multimode EDFA" IEEE Photonics Technology Letters, vol. 12, No. 10. Oct. 2000. pp. 1337-1339.

Teodoro, F., et al. "Diffraction-Limited, 300-KW Peak-Power Pulses From a Coiled Multimode Fiber Amplifier" Optical Society of America, Optics Letters, vol. 27, No. 7. Apr. 2002. pp. 518-520.

Zhu, B., et al. "112-TB/S Space-Division Multiplexed DWDM Transmission With 14-B/S/HZ Aggregate Spectral Efficiency Over a 76.8-KM Seven-Core Fiber" Optical Society of America, Optics Letters, vol. 19, No. 17. Aug. 2011. (7 Pages).

\* cited by examiner

MULTIMODE OPTICAL AMPLIFIER WITH CLOSE-LOOP MODAL GAIN CONTROL

RELATED APPLICATION INFORMATION

This application claims priority to provisional application Ser. No. 61/474,899 filed on Apr. 13, 2011, incorporated herein by reference.

BACKGROUND

1. Technical Field

The present invention relates to fiber optic communications and, in particular, to a multimode optical amplifier for use mode-division multiplexing systems.

2. Description of the Related Art

Advances in optical coherent detection and signal processing have led to tremendous growth in the spectral efficiency achieved in fiber. For example, 100 Tb/s transmissions at a spectral efficiency of 11 b/s/Hz are possible over a single-mode fiber. Owing to the nonlinear refractive index of silica—the primary material used in fiber optic cables—it is impossible to continue increasing spectral efficiency indefinitely by merely increasing the launched power. Even if the transmission medium were linear, Shannon's formula $C=B \log_2(1+P/N)$, where C is the channel capacity, B is the bandwidth of the channel, P is the total received power, and N is the total noise, shows that capacity only scales as the logarithm of signal-to-noise ratio. As a result, high spectral efficiency is power inefficient.

Space-division multiplexing (SDM) may be employed, where data is carried over a plurality of parallel channels, which follows similar trends in other fields such as computing and wireless communications. For example, in response to saturating clock speeds achieved in integrated circuits, computer engineers have used multi-core processors. Similarly, wireless communications have used multiple-input multiple-output (MIMO) antennas, with the achievable capacity increasing as the number of independent "eigen-channels", which is related to the maxima of the number of antennae employed at the transmitter and receiver.

In optical fiber transmission, two types of SDM schemes are available: (i) multicore fibers (MCF), where a single strand of glass fiber has a plurality of single- (or multi-) mode cores with low coupling, each capable of guiding optical signals; and (ii) multimode fibers (MMF), where a single strand of fiber has one core with sufficiently large cross-section area to support a number of orthogonal guided modes. Owing to the lack of available inline amplifiers, however, all MCF and MMF experiments to date have been single-span. To date, no attempt has been made to precisely control the gains seen by different propagating modes of an MMF at a given signal wavelength. On the contrary, MMFs have traditionally been used in a single-mode manner, with efforts being made to provide amplification for only one mode.

SUMMARY

A system for amplification includes a pump preparation module configured to provide a pump output that includes a plurality of pump modes; an amplification module configured to accept a multimode signal input and the pump output, such that the pump output causes an amplification of a plurality of modes in the signal input to produce an amplified signal output; and a gain control module configured to adjust a balance of the plurality of pump modes in the pump output to produce a predetermined amplified signal output.

A system for amplification includes a pump preparation module configured to provide a pump output that includes a plurality of pump modes in accordance with configuration values; a wavelength division multiplexing (WDM) combiner configured to combine a multimode signal input and the pump output into a combined output; an amplification module configured to accept the combined output of the WDM combiner, such that the pump output causes an amplification of a plurality of modes in the signal input to produce an amplified signal output; a WDM splitter that receives the output of the amplification module and is configured to split the amplified signal output and the pump output into separate outputs; and a gain control module configured to adjust the balance of the plurality of pump modes in the pump output according to a functional relationship between pump modes and signal gain, providing configuration values for the pump preparation module that produce the predetermined amplified signal output.

A method for amplification includes measuring a power for each mode in an unamplified multimode optical signal input; providing a multimode pump output to an amplifier, wherein the multimode pump output has a balance of mode powers that produce a predetermined differential gain for the optical input signal; and amplifying the optical input signal using an amplification medium and the multimode pump output to produce an amplified multimode optical signal output.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

For mode-division multiplexed (MDM) transmission over multimode fibers (MMF) to be viable over multi-span longhaul distances, multimode optical amplifiers are needed to boost optical signals. Until now, applications of multimode optical amplifiers based on, e.g., Erbium-doped fiber (EDF) have been limited to high-powered lasers and free-space communications, where a multimode optical waveguide is essentially used in a "single-mode" manner and no attempt is made to simultaneously transmit different data streams over different guided modes. In such systems, mode-dependent gain (MDG) is not critical. In MDM transmission, however, MDG should be carefully controlled. In addition, an MMF channel has mode-dependent loss (MDL) due to higher-order guided modes being less well confined, leading to higher bending loss. MDL can also arise from network elements such as switches, couplers, filters. From a system perspective, MDL (and MDG) is functionally similar to polarization-dependent loss (PDL) in single-mode fiber (SMF) systems, and can cause system outage. To realize high capacity and reliable system performance, MDL per span should be kept to a minimum. Hence, the present principles provide a practical multimode optical fiber amplifier that permits precise and dynamic control over the modal gains experienced by all the information-bearing signal modes.

Figure 1:
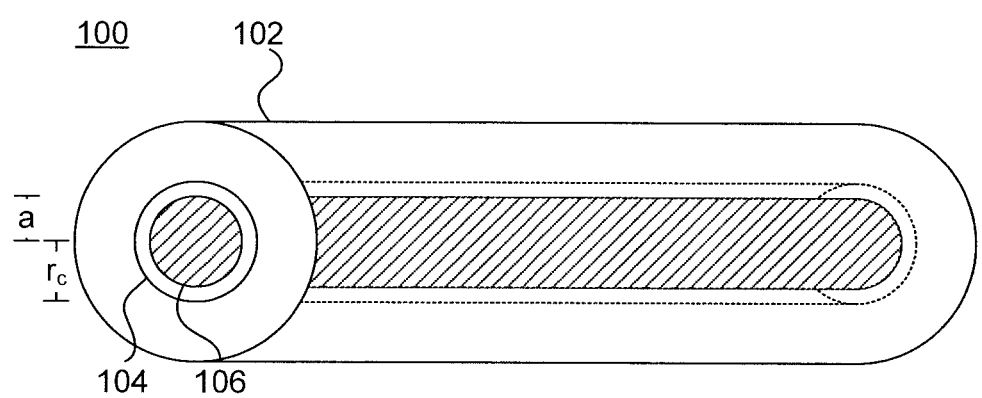
FIG. 1 is a diagram of an exemplary doped fiber amplifier according to the present principles.

Referring now to the drawings in which like numerals represent the same or similar elements and initially to FIG. 1, a cross section of an exemplary optical multimode amplifier 100 is shown. The amplifier 100 includes a core 104 with a doped portion 106 and a cladding layer 102. The present principles allow for control of MDG by precisely controlling the mode content of a pump at the input of the amplification medium 100. For a given distribution of signal mode powers inside a doped MMF, MDG is a function of the distribution of powers in the pump modes and the density profile of the dopant atoms in layer 106. Because it is impractical to change the dopant concentration profile dynamically, the present principles use pump preparation and closed-loop control to enable precise shaping of the pump radiation at the input of the amplification medium 100.

Although the present principles are described with respect to an amplification medium 100 having a single dopant in layer 106, it is considered that mixed dopant layers may be employed, and that multiple sections of amplification medium 100 may have a dopant layer 106 comprising different dopant materials. This allows pumps to be used having differing frequencies in addition to differing modes.

An MMF amplifier is described by a set of coupled differential equations involving the evolution of signal intensity in each signal mode along the amplifying medium 100, evolution of pump intensity in each pump mode along the amplifying medium 100, and a density profile of the dopant 106. The core 104 of amplifying medium 100 is shown as having a radius $r_c$, with the dopants 106 extending to a radius of $a \leq r_c$. The propagation equations for a signal and amplified spontaneous emission (ASE) in an $i^{th}$ mode at a signal wavelength of $\lambda_s$ is given by:

$$\frac{dP_{s,i}}{dz} = \int_0^{2\pi} \int_0^a r\,dr\,d\varphi P_{s,i}\Gamma_{s,i}(r,\varphi)[N_2(r,\varphi,z)\sigma_{es,i} - N_1(r,\varphi,z)\sigma_{as,i}] \quad (1)$$

$$\frac{dP_{ASE,i}}{dz} = \int_0^{2\pi}\int_0^a r\,dr\,d\varphi P_{ASE,i}\Gamma_{s,i}(r,\varphi)[N_2(r,\varphi,z)\sigma_{es,i} - N_1(r,\varphi,z)\sigma_{as,i}] + m_{g,i}\sigma_{es,i}h\nu_s\Delta\nu N_2(r,\varphi)\Gamma_{s,i}(r,\varphi) \quad (2)$$

The propagation equation for pump intensity in the $j^{th}$ mode at the pump wavelength of $\lambda_p$ is given by:

$$\frac{dP_{p,i}}{dz} = -\int_0^{2\pi}\int_0^a r\,dr\,d\varphi P_{p,j}\Gamma_{p,j}(r,\varphi)N_1(r,\varphi,z)\sigma_{ap,j} \quad (3)$$

The population density of dopant atoms in the ground state and first excited state are, respectively:

$$N_1(r,\varphi,z) = \frac{\frac{1}{\tau} + \sum_{i=1}^{m_s}\frac{[P_{s,i}(z)+P_{ASE,i}(z)]\sigma_{es,i}\Gamma_{s,i}(r,\varphi)}{h\nu_s}}{\frac{1}{\tau} + \sum_{i=1}^{m_s}\frac{[P_{s,i}(z)+P_{ASE,i}(z)](\sigma_{es,i}+\sigma_{as,i})\Gamma_{s,i}(r,\varphi)}{h\nu_s} + \sum_{j=1}^{m_p}\frac{P_{p,j}(z)\sigma_{ap,j}\Gamma_{p,j}(r,\varphi)}{h\nu_p}} N_0(r,\varphi) \quad (4)$$

$$N_2(r,\varphi,z) = \frac{\sum_{i=1}^{m_s}\frac{[P_{s,i}(z)+P_{ASE,i}(z)]\sigma_{as,i}\Gamma_{s,i}(r,\varphi)}{h\nu_s} + \sum_{j=1}^{m_p}\frac{P_{p,j}(z)\sigma_{ap,j}\Gamma_{p,j}(r,\varphi)}{h\nu_p}}{\frac{1}{\tau} + \sum_{i=1}^{m_s}\frac{[P_{s,i}(z)+P_{ASE,i}(z)](\sigma_{es,i}+\sigma_{as,i})\Gamma_{s,i}(r,\varphi)}{h\nu_s} + \sum_{j=1}^{m_p}\frac{P_{p,j}(z)\sigma_{ap,j}\Gamma_{p,j}(r,\varphi)}{h\nu_p}} N_0(r,\varphi) \quad (5)$$

In the above equations, $N_0(r,\phi)$ represents a concentration profile of dopant atoms, $N_1(r,\phi,z)$ represents a population density of the ground state, $N_2(r,\phi,z)$ represents a population density of the excited state, $\sigma_{es,i}$ represents an emission cross-section area for the $i^{th}$ mode at signal wavelength $\lambda_s$, $\sigma_{as,i}$ represents an absorption cross-section area for the $i^{th}$ mode at signal wavelength $\lambda_s$, $\sigma_{ap,j}$ represents an absorption cross-section for the $j^{th}$ mode at signal wavelength $\lambda_p$, $\nu_p$ represents an optical frequency of the pump, $\nu_s$ represents an optical frequency of the signal, $m_s$ represents a number of guided modes at the signal wavelength, $\Gamma_{p,j}(r,\phi)$ represents a normalized intensity profile for the $j^{th}$ pump mode, $\Gamma_{s,i}(r,\phi)$ represents a normalized intensity profile for the $i^{th}$ signal mode, $\tau$ represents a spontaneous emission lifetime for the excited state, $m_{g,i}$ represents a degeneracy factor for the $i^{th}$ signal mode, $\Delta\nu$ represents an equivalent amplifying bandwidth, $P_{p,j}$ represents a total power in the $j^{th}$ pump mode, $P_{s,i}$ represents a total power in the $i^{th}$ signal mode, $P_{ASE,i}$ represents an ASE power at the $i^{th}$ signal mode, and $m_p$ represents a number of guided modes at the pump wavelength. The gain and noise figure for each signal mode in the MMF may be computed by solving equations (1)-(5) numerically.

The present principles provide an optical amplifier 100 based in a "few-mode" MMF that supports two guided mode groups. If a step-index MMF is used, with a sharp difference in refractive index at the boundary between core 104 and cladding 102, these guided groups are a fundamental mode, which is well-approximated as a "linearly polarized" LP01 mode having two-fold degeneracy, and a higher-order LP11 mode with four-fold degeneracy. The total number of LP modes supported depends on the normalized frequency of the fiber 104, which is:

$$V = \frac{2\pi}{\lambda} r_c NA, \quad (6)$$

where λ is the wavelength of interest and NA is the numerical aperture. For a two-mode fiber, the normalized frequency V should be between about 2.405 and about 3.823.

It should be noted that, in practice, doping concentration does not have to be uniform, and can vary with radius from the center of the core 104. In other words, dopant concentration N0(r) is a function of said radius r. By having an annulus with higher dopant concentration (and a dip at the center), it becomes easier to produce higher gain for the signal LP11 mode. When generalizing the present principles to a large number of modes (beyond only the LP01 and LP11 signal modes considered in the present example), a complicated, highly optimized profile for N0(r) is used to make equalizing modal gain using only the variation of pump modes.

Figure 2A:
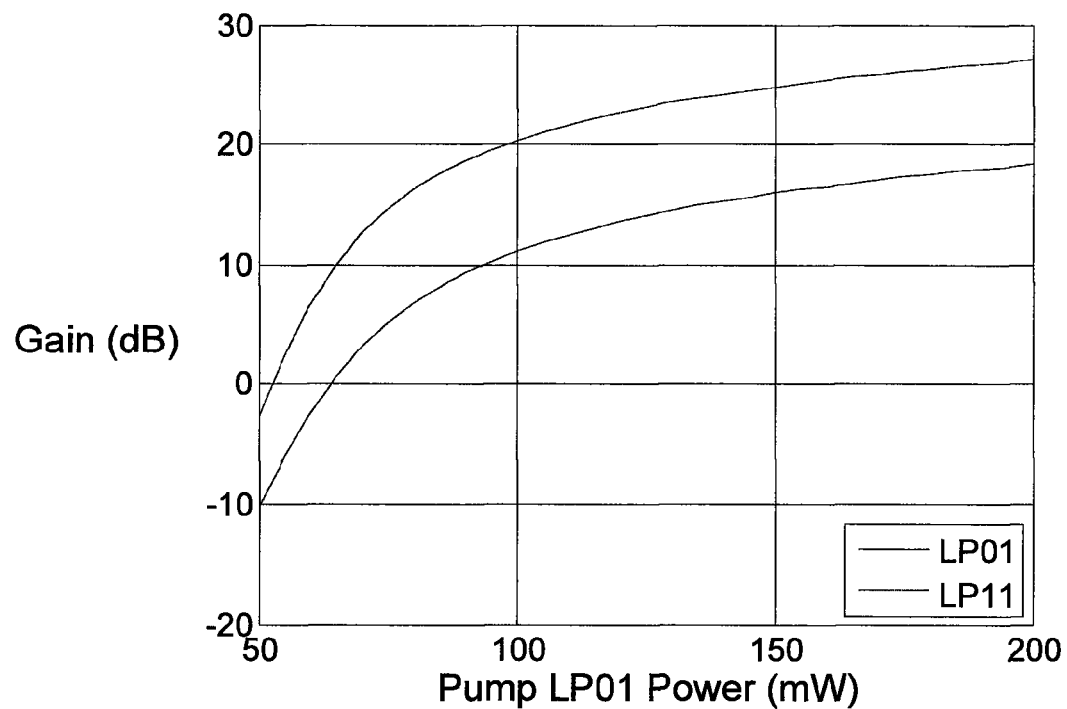
FIGS. 2a and 2b are graphs of differential gains according to signal modes under a given pump mode.
Figure 2B:
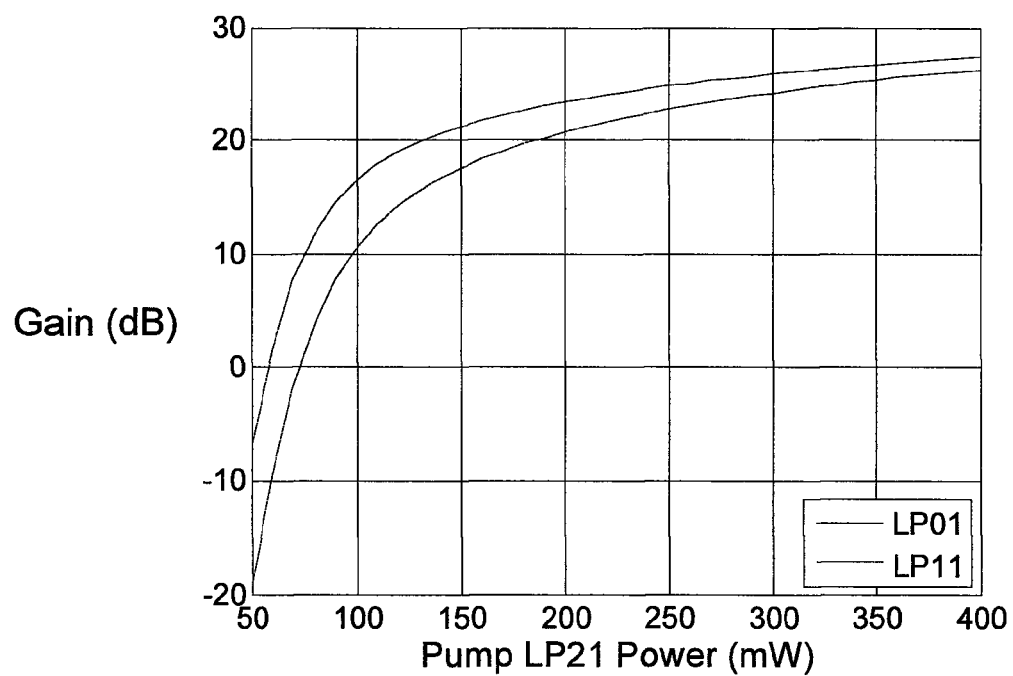

Referring now to FIGS. 2a and 2b, graphs are shown depicting modal gains of different signal modes when amplified by different pump modes. The horizontal axes show the power of the pumps in milliwatts for the LP01 and LP21 modes respectively, while the vertical axes show the gain in decibels. Two plots are shown on each graph, one solid and one dashed, referring respectively to the LP01 and LP11 signal modes. This data comes from a system having an input signal of 0.1 mW in power in the signal LP01 mode and in each of the two degenerate signal LP11 modes. The amplifying medium 100 in this exemplary case is assumed to be an erbium-doped fiber 30 meters long, having a core radius of $r_c$=8 μm and a numerical aperture of NA=0.1, providing a V number of 3.285 at a signal wavelength of 1530 nm and 5.129 at a pump wavelength of 980 nm. The core region 106 is uniformly doped with erbium atoms at an exemplary concentration of $N_0$=1×10$^{24}$ m$^{-3}$ to a radius of a=8 μm.

As can be readily seen, the LP01 pump mode preferentially boosts the strength of the LP01 signal mode over the LP11 signal mode, while the LP21 pump mode preferentially boosts the strength of the LP11 signal mode. As the intensity profile of the pump LP01 mode is better matched to the intensity profile of the signal LP01 mode than the signal LP11 mode, FIG. 2a shows the signal LP01 will have a higher gain than the signal LP11 mode. Conversely, the intensity profile of the pump LP21 mode is better matched to the signal LP11 mode, hence FIG. 2b shows the signal LP11 mode having higher gain.

It is therefore possible to control the relative gains of the signal LP01 and LP11 modes by precisely controlling the relative amounts of LP01 and LP21 radiation at the pump wavelength. Typically, the higher-order signal LP11 mode will have higher loss in the transmission fiber due to poorer confinement and higher bending loss. In addition, the LP11 mode typically has larger effective area than the LP01 mode, so is expected to have greater tolerance to fiber nonlinearity. It is thus expected that, in normal operation, the multimode optical amplifier will operate with higher gain for the signal LP11 mode than the signal LP01 mode. The pump should therefore primarily be in the LP21 mode, with a small amount of pump LP01 radiation introduced to adjust MDG to the desired value.

Figure 3:
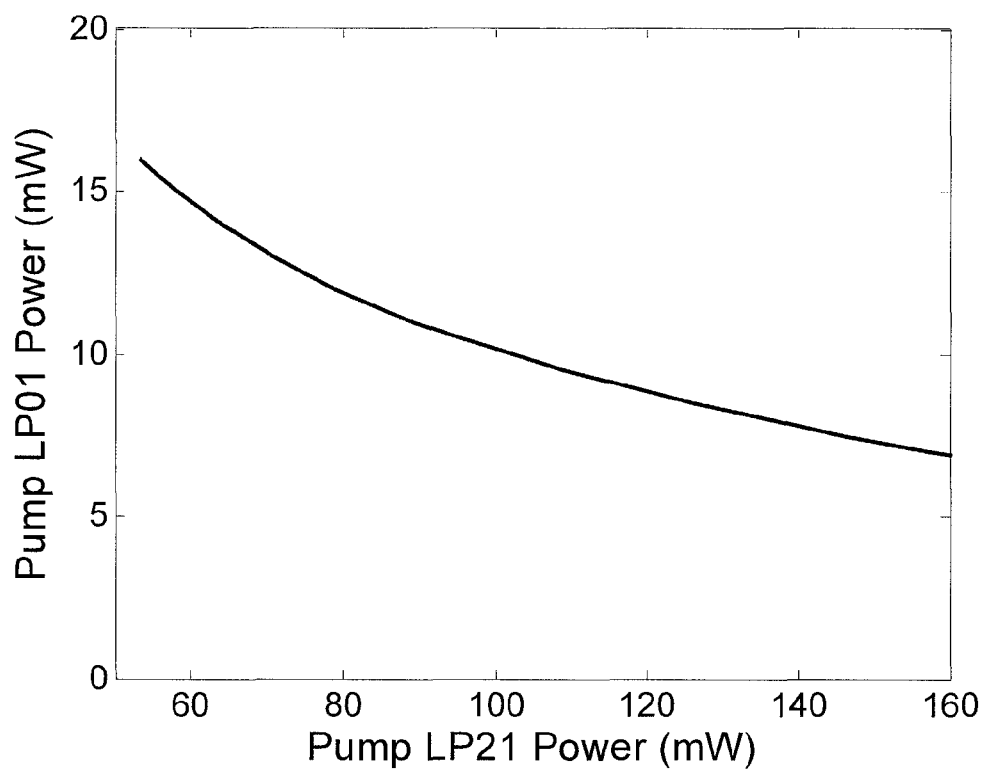
FIG. 3 is a graph of an exemplary power curve relating output powers for respective pump modes to produce a desired differential gain in signal amplification according to the present principles.

Referring now to FIG. 3, a graph is shown that depicts a curve that gives the respective powers for a pump LP01 mode (vertical axis) and a pump LP21 mode (horizontal axis) to maintain a 1 dB difference between the gains seen by the signal LP11 and LP01 modes ($\Delta G_{11-01}$). These results confirm it is indeed possible to control modal gain by precisely controlling the modal content of the pump. These results can also be generalized to higher-order mode-multiplexing using fibers with larger V-numbers. In general, modal gain in an N-mode MMF can be controlled using an N-mode pump. Provided that the family of pump modes is well chosen, the N degrees of freedom available enable flexible control of the N modal gains at the signal wavelength.

The curve shown in FIG. 3 follows a known functional relationship. Any pair of pump modes will have a similar curve that describes the relationship between pump modes and signal gains. Such a curve may be used to precisely tune the pump mode powers to produce a desired, predetermined signal output. A system that uses additional pump modes will have a more complicated functional relationship that may be represented, e.g., as a three- or higher-dimensional surface.

Figure 4:
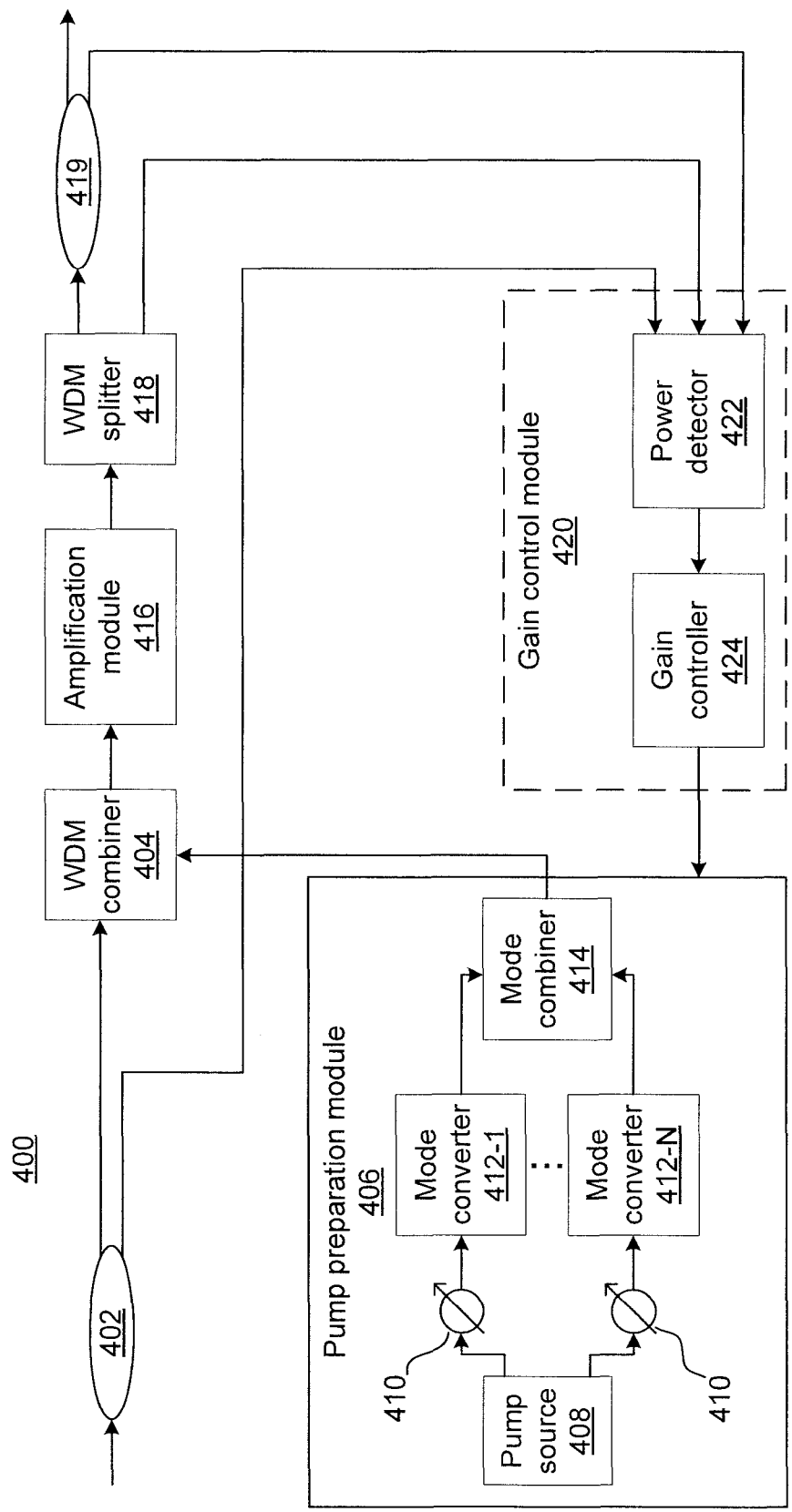
FIG. 4 is a diagram of an optical multimode amplification system according to the present principles.

Referring now to FIG. 4, an amplifier architecture 400 is shown. The amplifier 400 includes a pump preparation module 406, an amplification module 416 as described above, a gain control module 420, and other optical combining and splitting elements. The pump preparation module 406 generates an output radiation at the pump wavelength(s) with a desired mode content. The signal arrives at splitter 402, which provides one signal to the gain control module 420 and the other to a wavelength division multiplexing (WDM) combiner 404. The WDM combiner 404 takes the signal and the output of the pump preparation module 406, typically at different sets of wavelengths, and spatially combines the two. The spatially overlapping signal and pump output is then injected into the amplification module 416, which amplifies the signal according to the mechanism described above. At the output of the amplification module 416, a multimode WDM splitter 418 directs the signal and pump radiations to two different output ports. The signal component goes into a multimode passive splitter 419, where one of the splitter outputs become the amplified device output, and the other splitter output goes to the input of the gain control module 420 alongside a portion of the signal input from splitter 402 and the pump output of the amplification module 416 from WDM splitter 418. The gain control module 420 uses a power detector 422 to determine the levels of the respective inputs, which gain controller 424 uses to produce a control signal that adjusts the mode content of the pump radiation produced by the pump preparation module 406.

The pump preparation module 406 generates an output radiation at the pump wavelength(s) with the desired mode content. The pump module has a pump source 408, typically a laser whose wavelength $\lambda_p$ is selected to provide gain at the signal wavelength $\lambda_s$. The choice of pump wavelength depends on the gain medium 106 used in the amplification module 416. For example, if the gain medium 106 is erbium-doped fiber (EDF), a suitable pump wavelength is 980 nm. However, other values may be chosen. The pump source 408 produces a plurality of N outputs, which may have originated from different pump sources 408, or from a single pump source 408 optically split into N parts. Two of the outputs and of pump source 408 are shown herein. The outputs are passed through variable optical attenuators (VOAs) 410. The VOAs 410 enable dynamic control of the relative powers between the pump modes produced by the pump source 408. The parallel outputs of the VOAs 410 are processed by N parallel mode converters 412, which transform the spatial profile at their respectively inputs to the desired spatial profiles at their outputs. To use the example discussed above, if the mode converter inputs are in the pump LP01 mode, mode converter 412-1 may be configured as a bypass, whereas mode converter 412-2 may convert LP01 radiation to LP21 radiation. The mode converters 412 can use various technologies including free-space optics, where phase masks, spatial light modulator and lenses may be used to modulate the amplitude and/or phase of the input beam. Alternatively, the mode converters may also use guided-wave structures such as gratings based in multimode fiber, with the period of the grating chosen to efficiently convert the input pump mode to the desired output pump mode. The outputs of the N mode converters 412 are combined in a multimode mode combiner 414, producing an output radiation that is the spatial superposition of its inputs. The mode combiner 414 may use free-space components such as lenses and half-mirrors, or it may use guided-wave structures such as a properly designed multimode coupler.

The multimode WDM combiner 404 combines has two input ports for the signal and pump, and produces an output that is the spatial superposition of the respective inputs. The component can be realized in free-space components such as a dielectric stack filter or a half-mirror. Alternatively, a multimode guided-wave structure such as a properly designed multimode coupler can also be used.

The input to the amplification module 416 is the spatially overlapping signal and pump radiation. The amplification module 416 has an amplification medium 100 where photon energy of the pump is transferred to the signal, producing an output where the signal wavelength has experienced an increase in optical power relative to the input. The amplification medium 100 is typically a multimode fiber 104 having a portion 106 that is doped with Erbium (Er), Thulium (Tm), Ytterbium (Yb), Neodymium (Nd) or other suitable elements. The number of spatial modes that can be amplified depend on the geometry of the doped fiber 104, which includes the size of the core 104 and the size of the doped region 106. As discussed above, the gain seen by each signal mode depends on the mode content of the pump and the density profile of dopant within the amplifying medium.

Although it is specifically contemplated that the amplification medium 100 will have a single dopant, it is also contemplated that the amplification medium may use multiple dopants, each having a different associated pump frequency. Hence, pump preparation module 406 may therefore also include multiple pump sources 408 operating at different wavelengths in addition to different modes.

Without loss of generality, in the example discussed above, the amplification medium 100 is a step-index fiber whose V-number lies between the cutoff of the second- and third-order group of modes at the signal wavelength ($2.405 < V < 3.832$). The step-index core 104 is uniformly doped with Erbium, and the pump preparation module 406 ensures the correct proportion of LP01 and LP21 radiation at the pump wavelength is produced at the input interface of the amplification medium 100. However, other combinations of dopant profile, signal spatial modes and pump spatial modes exist. The EDF can also be a graded-index fiber or any other refractive index profile.

It should be recognized that the pump and signal inputs may pass through the amplification medium 100 in either direction with respect to one another. For example, in the present example, co-pumping is shown where the signal and pump are provided to the amplification medium on the same side. However, it is also contemplated that backward pumping may be employed, where the positions of the pump preparation module 406 and the gain control module 420 are exchanged. In the most general case, it is possible to pump from both sides of the amplification module 416.

The multimode WDM splitter 418 takes the spatially overlapping signal and pump output of the amplification module 416 and separates their radiation in accordance with their wavelengths, producing the signal wavelength and the pump wavelength as outputs. The multimode WDM splitter 418 can be realized using free-space components such as dielectric stack filters or half-mirrors+optical bandpass filters. Alternatively, multimode guided-wave structures such as a properly designed multimode coupler can also be used.

The gain control unit 420 has a power detector 422 that can measure the powers at each of the spatial modes of the input signal, output pump, and output signal. One method of realizing the power detector is to use free-space power splitters and phase-masks. Other constructions are possible, such as using gratings in multimode guided-wave structures to spatially separate the individual pump modes and individual signal modes. Based on the powers measurements made at power detector 422, the gain controller 424 produces output signal(s) that control the pump preparation module 406. The gain controller 424 may make adjustments according to a functional relationship as described above with respect to FIG. 3, may have a table of known pump values stored, or may use an algorithmic approach that adjusts pump modes and uses the measured results to close in on an optimal configuration. The components of the pump preparation module 406 that can be adjusted may include, but are not limited to, the drive current(s) for the pump source(s) 408, control signals for any variable optical attenuators 410, control signals for any fiber-based gratings, and micro-positioners or other devices.

It should also be noted that power detector 422 monitors the output of pump preparation module 406 in addition to the amplified signal output. There are various parameters in equations 1-5 which may deviate from design values due to variations in manufacturing processes and environmental effects. Therefore, having the ability to measure the pump absorption can help the gain controller 424 better determine the parameters to use for equations 1-5.

Figure 5:
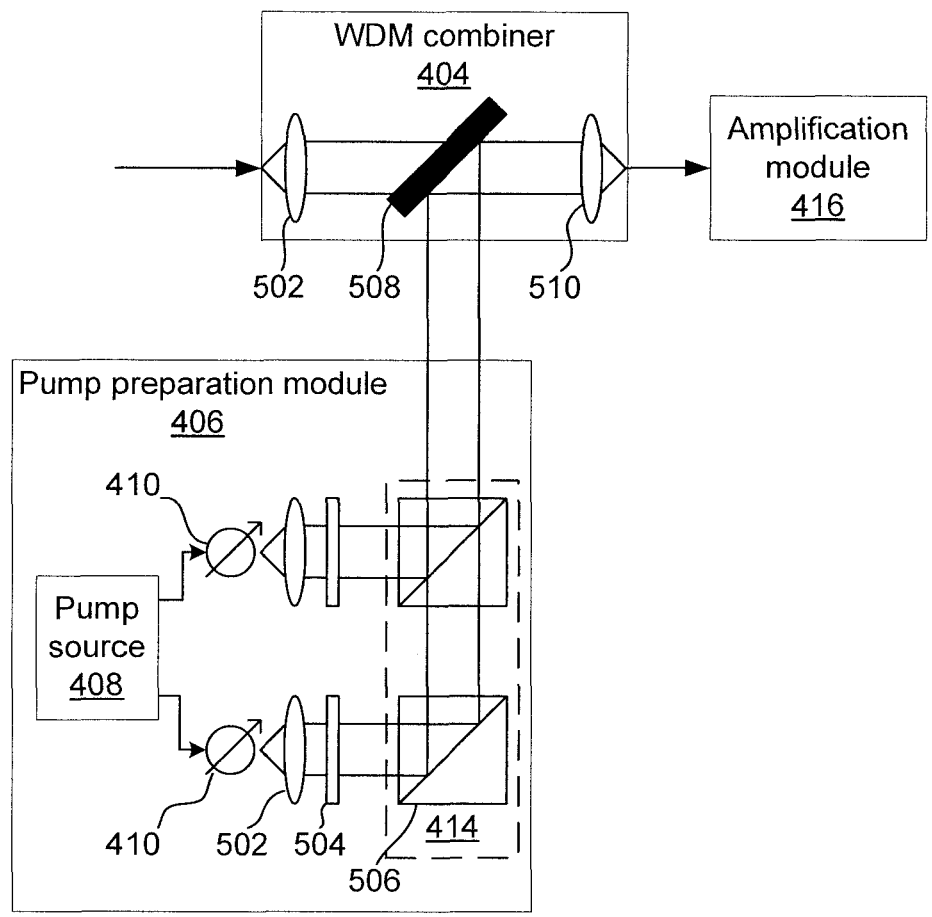
FIG. 5 is a diagram of an exemplary wavelength division multiplexing (WDM) combiner and pump preparation module according to the present principles.

Referring now to FIG. 5, an embodiment of a pump preparation module 406 is shown that employs free space optics. The pump source 408 provides light at the pump wavelength to VOAs 410. Each path then is passed through lens 502 to broaden the beam, which is then passed through a phase mask 504 to limit the pump radiation to a desired mode (e.g., LP01 or LP21). Mode combiner 414 includes a set of beam combiners 506, arranged to organize the different light paths into a single beam output.

The combined pump modes pass to WDM combiner 404, where the input signal has passed through a lens 502 to spread the beam. The WDM combiner 404 has two input ports, one for the signal and one for the pump, and produces an output that is the spatial superposition of the two inputs. The WDM combiner 404 may be implemented with free-space components. The signal beam and the pump beam interact at a free-space combiner 508 which may be, e.g., a dielectric stack filter or half-mirror. A lens 510 then focuses the beam to a size appropriate for transmission on a fiber and the combined signal and pump proceed onto amplification module 416.

Figure 6:
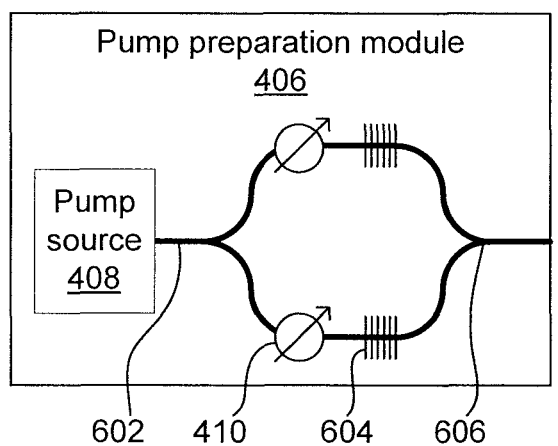
FIG. 6 is a diagram of an alternative embodiment of a pump preparation module according to the present principles.

Referring now to FIG. 6, an alternative embodiment of a pump preparation module 406 is shown. The pump source 408 feeds pump radiation into a waveguide 602. The waveguide passes through VOAs 410 before reaching MMF gratings 604. The MMF gratings 604 have a spatial period that efficiently converts the input pump mode to a desired output pump mode. The N modes come together at MMF coupler 606 to form a single multimode pump output for the pump preparation module 406, with the output being the spatial superposition of the modes.

Figure 7:
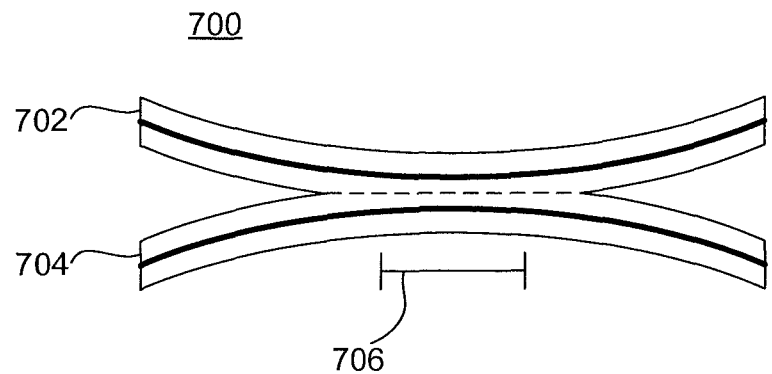
FIG. 7 is a diagram of an alternative embodiment of a WDM combiner according to the present principles.

Referring now to FIG. 7, an alternative embodiment of WDM combiner 404 is shown using a multimode guided-wave structure 700. A first signal fiber 702 carries input signal modes at a wavelength $\lambda_s$, and a second pump fiber 704 carries input pump modes at a wavelength $\lambda_p$. The two fibers 702 and 704 join and their respective contents interact over a length 706. The result from the WDM combiner 700 is a spatially overlapping signal and pump output having both wavelengths $\lambda_s + \lambda_p$.

It is possible to design a WDM combiner such that presenting its two inputs with two wavelengths produces a WDM output. The coupler includes consists of two waveguides brought in close proximity so that the cores 702 and 704 interact. By carefully controlling the amount of coupling (spacing), the interaction length and a phase-matching condition, it is possible to make one wavelength remain in its waveguide while the other wavelength switch waveguides.

Figure 8:
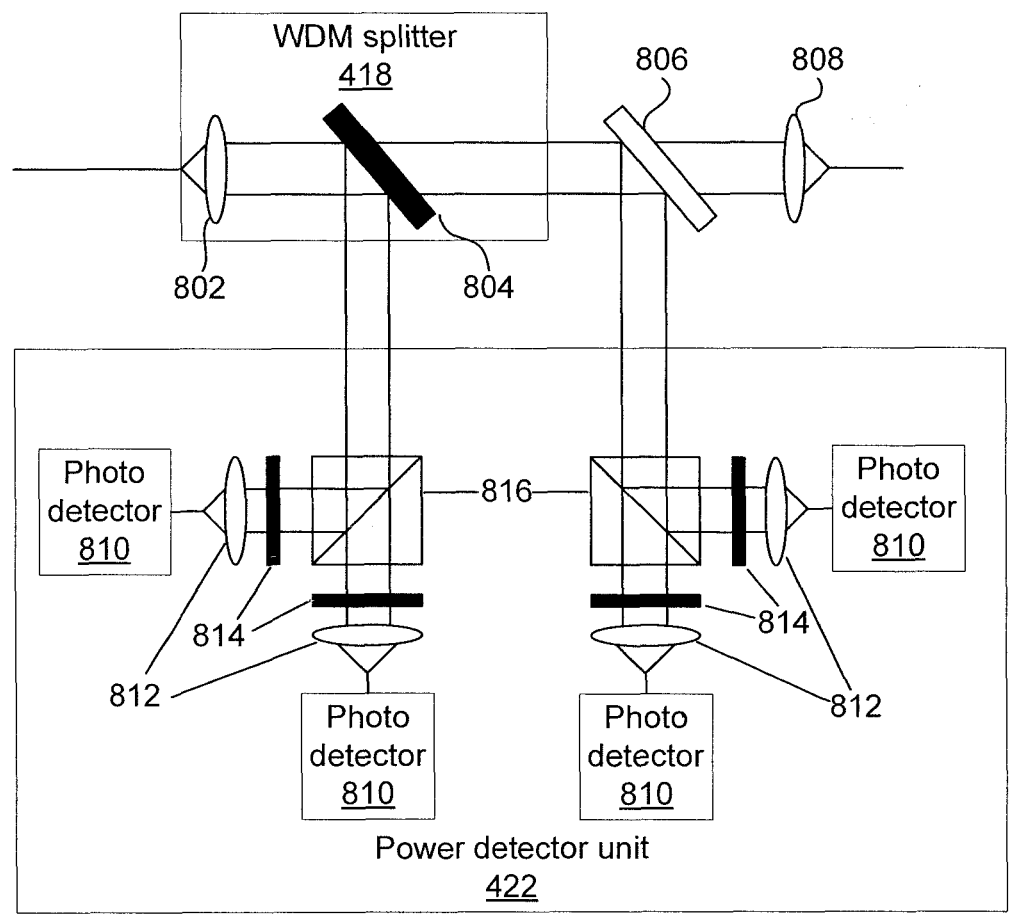
FIG. 8 is a diagram of an exemplary WDM splitter and power detector unit according to the present principles.

Referring now to FIG. 8, an embodiment of a multimode WDM splitter 418 and power detector 422 is shown. WDM splitter 418 is shown as being implemented with free space optics that include a lens 802 and a dielectric stack filter 804. The filter 804 splits the input signal into component wavelengths, with the pump wavelength being directed to power detector unit 422 and the signal wavelength being directed to a half-mirror 806. The signal wavelength is split by the half-mirror, with one branch going to power detector unit and the other being focused by lens 802 to, e.g., a fiber medium.

The power detector unit 422 includes photo detectors 810 to measure the intensity of various modes. The input beams are split at splitters 816, which may be implemented, e.g., as half-mirrors. The respective split beams then pass through phase masks 814 to limit the beam to a particular desired signal or pump mode and then focused by lenses 812 onto photodetectors 810. In this manner, the strength of pump and signal modes can be measured after amplification to verify that the signal has been amplified by the desired amount. Other implementations of the power detector unit 422 may be constructed, using for example multimode guided-wave structures to spatially separate the individual pump and signal modes.

Figure 9:
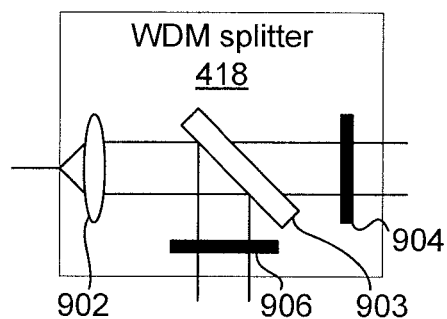
FIG. 9 is a diagram of an alternative embodiment of a WDM splitter according to the present principles.

Referring now to FIG. 9, an alternative embodiment of WDM splitter 418 is shown. The combined signal and pump input is focused by lens 902 onto a half-mirror 903, which splits the combined input into the two paths described above. One path has a first optical band-pass filter 904 which allows only the signal wavelength $\lambda_s$ to pass, whereas the other path has a second optical band-pass filter 906 which allows only the pump wavelength $\lambda_p$ to pass.

Figure 10:
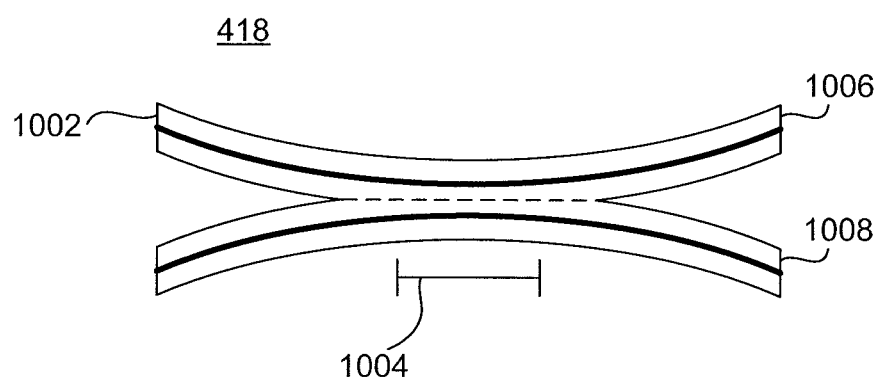
FIG. 10 is a diagram of an alternative embodiment of a WDM splitter according to the present principles.

Referring now to FIG. 10, an alternative embodiment of WDM splitter 418 is shown using a multimode coupler. An input 1002 is provided that includes spatially overlapping signal and pulse wavelengths $\lambda_s + \lambda_p$. The input fiber meets with a second fiber along an interaction length 1004, producing two separate output fibers 1006 and 1008, having the output signal modes at $\lambda_s$ and the output pump modes at $\lambda_p$ respectively. In the same manner as shown above with respect to FIG. 7, the waveguides may be tuned such that one wavelength remains in the input waveguide 1002, while the other jumps to the second waveguide output 1008.

Figure 11:
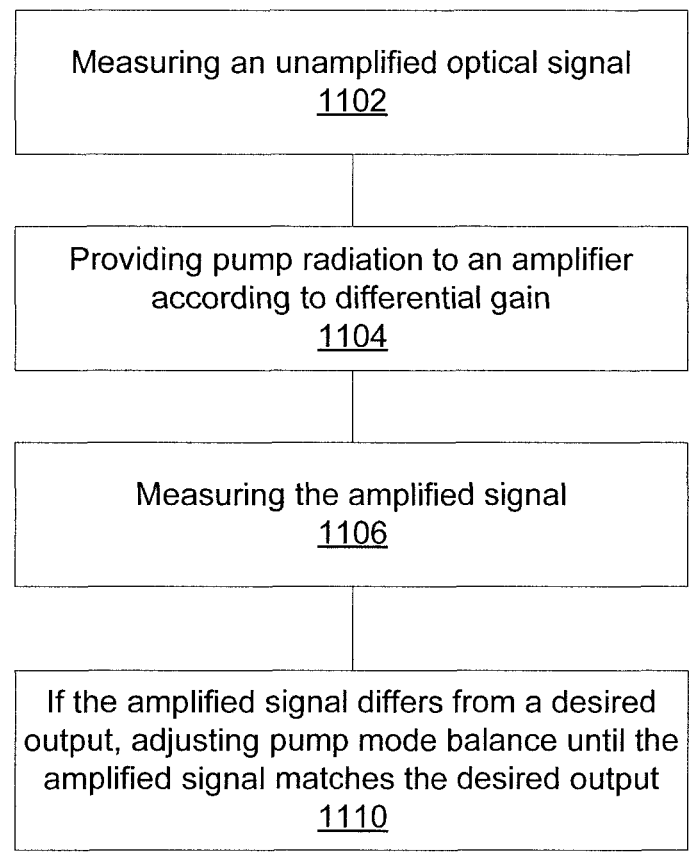
FIG. 11 is a block/flow diagram showing an exemplary method for adjusting pump outputs in accordance with to differential signal gain according to the present principles.

Referring now to FIG. 11, a method for adjusting pump output is shown. Block 1102 measures the unamplified optical signal using, e.g., power detector 422. Block 1104 provides pump radiation to the amplification module 416 according to a calculated differential gain. In particular, block 1104 triggers pump preparation module 406 to produce pump radiation in a combination of pump modes that will promote gain for the signal in the amplification module 416 that takes into account the differential amplification that signal modes undergo when boosted by particular pump modes.

Block 1106 measures the amplified signal and, optionally, the pump signal after amplification, using the power detector 422. The measured power information is used to determine whether further adjustment of the pump modes is needed. If so, and the amplified signal modes differ from a desired power and balance, then block 1110 causes gain controller 424 to adjust the parameters of pump preparation module 406, such that the pump output modes cause a desired change in the amplified signal mode balance and power.

Having described preferred embodiments of a system and method for multimode optical amplification with close-loop modal gain control (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for amplification, comprising:
a pump preparation module configured to provide a pump output that includes a plurality of pump modes;
an amplification module configured to accept a multimode signal input and the pump output, such that the pump output causes an amplification of a plurality of modes in the signal input to produce an amplified signal output; and
a gain control module configured to adjust a balance of the plurality of pump modes in the pump output to produce a predetermined amplified signal output.

2. The system of claim 1, wherein the gain control module configured to adjust the balance of the plurality of pump modes according to a functional relationship between pump modes and signal gain to provide configuration values for the pump preparation module that produce the predetermined amplified signal output.

3. The system of claim 1, wherein the gain control module comprises a table of pump mode values configured to provide configuration values for the pump preparation module that produce the predetermined amplified signal output.

4. The system of claim 1, wherein the amplification modules comprises a region of doped fiber having a differential amplification response that depends on input signal and pump modes.

5. The system of claim 1, further comprising a power detector unit comprising a plurality of photodetectors configured to measure the power output of each pump output mode and each amplified signal output mode, configured to provide output power information to the gain control module for use in adjusting the pump mode balance.

6. The system of claim 1, wherein the pump preparation module comprises:
a plurality of mode converters, one for each pump mode output, configured to accept an input and to produce an output that includes only a single pump mode;

a plurality of variable optical attenuator, each connected between a pump source and a mode converter, configured to produce a specified power balance between pump modes; and
  a mode combiner configured to combine the single-mode outputs of the plurality of mode converters into a single multimode pump output.

7. The system of claim 6, wherein the mode converters are freespace phase masks configured to permit only a single pump mode.

8. The system of claim 6, wherein the mode converters are gratings based in multimode fiber configured to permit only a single pump mode.

9. The system of claim 1, further comprising a wavelength division multiplexing (WDM) combiner configured to combine the multimode signal input and the pump output into a single output that is provided to the amplification module.

10. The system of claim 9, wherein the WDM combiner comprises one of a dielectric stack filter and a half-mirror.

11. The system of claim 9, wherein the WDM combiner comprises a multimode fiber combiner.

12. The system of claim 1, further comprising a wavelength division multiplexing (WDM) splitter that receives the output of the amplification module and is configured to split the amplified signal output and the pump output into separate outputs.

13. The system of claim 12, wherein the WDM splitter is a dielectric stack.

14. The system of claim 12, wherein the WDM splitter comprises a half-mirror and a set of optical bandpass filters configured to limit the outputs based on wavelength.

15. The system of claim 12, wherein the WDM splitter is a multimode fiber coupler.

16. A system for amplification, comprising:
  a pump preparation module configured to provide a pump output that includes a plurality of pump modes in accordance with configuration values;
  a wavelength division multiplexing (WDM) combiner configured to combine a multimode signal input and the pump output into a combined output;
  an amplification module configured to accept the combined output of the WDM combiner, such that the pump output causes an amplification of a plurality of modes in the signal input to produce an amplified signal output;
  a WDM splitter that receives the output of the amplification module and is configured to split the amplified signal output and the pump output into separate outputs; and
  a gain control module configured to adjust the balance of the plurality of pump modes in the pump output according to a functional relationship between pump modes and signal gain, providing configuration values for the pump preparation module that produce the predetermined amplified signal output.

17. A method for amplification, comprising:
measuring a power for each mode in an unamplified multimode optical signal input;
providing a multimode pump output to an amplifier, wherein the multimode pump output has a balance of mode powers that produce a predetermined differential gain for the optical input signal; and
amplifying the optical input signal using an amplification medium and the multimode pump output to produce an amplified multimode optical signal output.

18. The method of claim 17, further comprising:
measuring a power of the modes of the amplified multimode optical signal output;
adjusting the balance of the multimode pump output if the power of the modes differs from a predetermined target output power.

19. The method of claim 17, wherein providing the multimode pump output comprises:
producing a plurality of multimode pump paths;
limiting each path to a different pump mode; and
adjusting the power of each path to produce the balance of mode powers.

* * * * *